United States Patent
Hollnagel et al.

(10) Patent No.: US 11,624,735 B2
(45) Date of Patent: Apr. 11, 2023

(54) LIQUID CHROMATOGRAPHY SYSTEM, METHOD AND USE

(71) Applicant: DIONEX SOFTRON GMBH, Germering (DE)

(72) Inventors: Christoph Hollnagel, Gauting (DE); Remco Swart, Gauting (DE); Hermann Hochgraeber, Offenburg (DE)

(73) Assignee: Dionex Softron, Germering (DE)

( * ) Notice: Subject to any disclaimer, the term of this patent is extended or adjusted under 35 U.S.C. 154(b) by 0 days.

(21) Appl. No.: 17/199,812

(22) Filed: Mar. 12, 2021

(65) Prior Publication Data
US 2021/0199628 A1 Jul. 1, 2021

Related U.S. Application Data

(63) Continuation of application No. 15/809,136, filed on Nov. 10, 2017, now Pat. No. 10,948,463.

(30) Foreign Application Priority Data

Nov. 10, 2016 (DE) .......................... 102016121512.0

(51) Int. Cl.
*G01N 30/20* (2006.01)
*G01N 30/22* (2006.01)
(Continued)

(52) U.S. Cl.
CPC .............. *G01N 30/32* (2013.01); *G01N 30/20* (2013.01); *G01N 30/22* (2013.01); *G01N 30/24* (2013.01); *G01N 2030/027* (2013.01)

(58) Field of Classification Search
CPC ........ G01N 30/20; G01N 30/22; G01N 30/24; G01N 30/32; G01N 2030/027
See application file for complete search history.

(56) References Cited

U.S. PATENT DOCUMENTS

| | | |
|---|---|---|
| 3,530,721 A | 9/1970 | Hrdina |
| 4,939,943 A | 7/1990 | Strohmeier |

(Continued)

FOREIGN PATENT DOCUMENTS

| | | |
|---|---|---|
| CN | 101529243 A | 9/2009 |
| CN | 103884807 A | 6/2014 |

(Continued)

OTHER PUBLICATIONS

Duxin, et al., "Improvement of Interface in Comprehensive Two-Dimensional Liquid chromatography and its Application in the Research of Proteomics", Chinese Journal of Chromatography, vol. 28, No. 2, Feb. 28, 2010, pp. 163-167.

*Primary Examiner* — Herbert K Roberts

(57) ABSTRACT

A method performed in a liquid chromatography system includes a metering device pushing a sample into a trap column. The metering device sucks in the sample from a sample reservoir, wherein the sucking in the sample from a sample reservoir precedes the step of pushing the sample into the trap column. The liquid chromatography system also includes a trap column and a metering device, wherein the system is adapted to assume a configuration allowing the metering device to push a sample into the trap column and wherein the metering device is adapted to push the sample into the trap column in this configuration, wherein the system is adapted to assume a configuration allowing the sample to be sucked into the system by means of the metering device. Furthermore, the invention relates to a use of the liquid chromatography system for liquid chromatography, in particular of high-pressure liquid chromatography.

5 Claims, 6 Drawing Sheets

(51) Int. Cl.
  *G01N 30/24*   (2006.01)
  *G01N 30/32*   (2006.01)
  *G01N 30/02*   (2006.01)

(56) References Cited

U.S. PATENT DOCUMENTS

| | | | |
|---|---|---|---|
| 9,003,868 B2* | 4/2015 | Ono | G01N 30/24 |
| | | | 73/61.55 |
| 2004/0262513 A1* | 12/2004 | Karol | H01J 49/0418 |
| | | | 250/288 |
| 2008/0156080 A1 | 7/2008 | Balgley | |
| 2008/0210614 A1* | 9/2008 | Gilar | G01N 30/34 |
| | | | 556/400 |
| 2008/0217254 A1* | 9/2008 | Anderson | B01L 3/0289 |
| | | | 210/695 |
| 2009/0078031 A1 | 3/2009 | Ono et al. | |
| 2009/0205409 A1* | 8/2009 | Ciavarini | G05D 11/132 |
| | | | 73/61.56 |
| 2010/0072748 A1 | 3/2010 | Van Pelt | |
| 2012/0132013 A1 | 5/2012 | Glatz et al. | |
| 2013/0333452 A1* | 12/2013 | Suzuki | G01N 35/1095 |
| | | | 73/64.56 |
| 2015/0377843 A1* | 12/2015 | Morikawa | G01N 30/24 |
| | | | 73/863.02 |
| 2016/0025689 A1 | 1/2016 | Glatz et al. | |
| 2016/0077061 A1 | 3/2016 | Cormier | |
| 2019/0120800 A1 | 4/2019 | Cormier | |

FOREIGN PATENT DOCUMENTS

| | | |
|---|---|---|
| CN | 105308448 A | 2/2016 |
| CN | 105308449 A | 2/2016 |
| WO | 2014199198 A1 | 12/2014 |
| WO | 2014199201 A1 | 12/2014 |

* cited by examiner

LIQUID CHROMATOGRAPHY SYSTEM, METHOD AND USE

CROSS-REFERENCE TO RELATED APPLICATION

This application is a continuation under 35 U.S.C. § 120 and claims the priority benefit of co-pending U.S. patent application Ser. No. 15/809,136, filed on Nov. 10, 2017, which claims the priority benefit under 35 U.S.C. § 119 to German Patent Application No. DE 10 2016 121 512.0, filed on Nov. 10, 2016, the disclosure of each of the foregoing applications is incorporated herein by reference.

FIELD OF THE INVENTION

The invention lies in the field of liquid chromatography (LC) and particularly in the field of High Performance Liquid Chromatography (HPLC). The goal of this analytical method is the division of a sample into its constituent parts followed by quantifying of their respective proportions, or a simple separation. More particularly, the present invention relates to a liquid chromatography system, a method performed in such a system and a corresponding use of such a system.

BACKGROUND

In LC systems, a liquid sample is introduced with an analytical pump into a separation column. Different constituents of the sample adhere to the separation column in a different manner. A pump pushes a solvent (or different solvents) through the separation column. Depending on, inter alia, the adherence of the constituents to the separation column, the solvent, the flow rate of the solvent and the pressure of the solvent, the different constituents of the sample need different amounts of time to pass through the separation column; generally, the more strongly a constituent interacts with the separation column, the longer it will need to pass through the separation column. This allows the constituents (and thus, the sample) to be determined and analyzed.

Introducing the sample into the separation column typically comprises different steps including (1) a sample pick up means, such as a needle, being introduced into a sample reservoir and picking up the sample. (2) The sample may then be introduced from the needle into a section for intermediate storing of the sample. Subsequently, (3) the sample may be introduced from the section for intermediate storing of the sample into the separation column. For this purpose, injection valves may be used. Such injection valves or distribution valves may connect different ports with one another to establish a fluid connection between different parts or sections of an LC system. For example, U.S. Pat. No. 3,530,721 discloses an apparatus for supplying liquid samples into a separation column. The apparatus includes a switch that can be switched from one state allowing a sample to be drawn into a receptacle (e.g., for carrying our steps (1) and (2)) to another state allowing the sample to be pumped from the receptacle into a column (e.g., for carrying out the above described step (3)). U.S. Pat. No. 4,939,943 discloses an injector including a high pressure syringe unit and a valve unit for LC, which valve unit is adapted to assume different positions, one for sample pick up and one for introducing the sample into a chromatographic column.

A further variant of LC systems includes a so-called trap column. Instead of intermediate storing of the sample in a simple section of tubing or in a simple receptacle, the sample may first be introduced into a trap column and constituents of the sample may adhere to the trap column (which may also be called a "pre-column"). Thus, by means of the trap column, the sample may be concentrated. In other words, when injecting the sample through a trap column, the sample is guided with the help of a pumping device through the trap column (or pre-column). The sample components remain hanging in the column on the material in the column. The sample can therefore be concentrated. Subsequently, the sample may be entrained in an analytical flow from the trap column through the separation column. Again, switching from the first step (introducing a sample into the trap column) to the second step (providing a flow to introduce the sample from the trap column to the separation column) may be done by switching of a valve. In other words, after introducing the sample into the trap column, the trap column is connected with an analytical flow, the sample detaches from the trap column, and is guided into the separation column (which may also be referred to as an analytical column). The separation of the sample from the trap column is enabled by the interaction of the sample with the column and the flow.

A part of such systems are samplers that are responsible for sample management and accurate collection of the sample. After sample collection, the sample is either brought to an analytical fluid path by the switching of valves, or first pumped into the above described trap column for concentration with the help of a pumping device. The trap column is then connected to the analytical fluid path, as also described above.

The analytical pump then either pushes the sample directly through the trap column (continuation of the flow direction) or away from the trap column to the separation column (reversal of the flow direction). In the separation column, the sample separation then takes place due to the different interactions of the sample constituents with the column and the flow. After the column, the sample is passed through a detector that detects each constituent of the sample, e.g. by optical detection.

That is, in very simple words, a sample is picked up and introduced into a trap column. The trap column is then fluidly connected to a separation column and the sample is supplied from the trap column to the separation column. The supplying of the sample from the trap column to the separation column is typically done by means of an analytical pump providing a pressure exceeding the atmospheric pressure. In HPLC, this pressure may be on the order of 1000 bar, such as 1500 bar.

For the above described process, LC systems are typically used. Such systems typically comprise a plurality of components, including a sample pick up means, a metering device for introducing a desired amount of a sample into the system, a separation column for separating the constituents of the sample and pumps for providing a flow between the components. As discussed, a trap column may also be provided, e.g., for sample concentration. The discussed components may be fluidly connected with each other (i.e., connected in such a way that fluid may flow from one component to another and/or vice versa) by means of a valve, which valve may also be referred to as a switching valve or a distribution valve. Such a valve may selectively connect the components to one another.

While known systems are satisfactory in some regards, they have certain disadvantages and limitations. For example, as discussed, the known systems comprise a plurality of different components. This make these systems complex and prone to failure, as each component may malfunction. The complexity of the systems also makes such systems difficult to service. Furthermore, such complex systems also need a relatively large amount of space.

SUMMARY

In light of the above, it is an object of the present invention to overcome or at least alleviate the shortcomings and disadvantages of the prior art. In particular, it is an object of the present invention to provide a system and a corresponding method decreasing the complexity of the systems, being more failsafe, being less prone to failure, taking up less space and/or being simpler to service.

These objects are met by the present invention.

In one embodiment, these objects are met by a method in accordance with the present invention. The method is performed in a liquid chromatography system and the method comprises a metering device pushing a sample into a trap column.

In other words, the metering device causes a positive pressure which causes the sample to be transferred (from another component) to the trap column.

This may be different to some prior art technologies. In the prior art, when a trap column was used, there was usually provided an additional pump for bringing the sample into the trap column (i.e., onto the material of the trap column). In contrast, the present invention uses the metering device to bring the sample into the trap column. That is, the invention relates a method for loading the sample into the trap column without a separate pumping device. In still other words, the metering device is used for additional tasks. This renders the additional pump used in the prior art to bring the sample into the trap column superfluous. Thus, a system with less parts may be provided, resulting in a simpler and less complex system. Such a system may also be less prone to failure and simpler to service (as there are fewer parts).

It will be understood that the sample may be a liquid sample. As will further be understood, when the sample is introduced into the trap column, some constituents of the sample will adhere to the trap column while other constituents may not adhere and may flow through the trap column and go to waste (which may also be referred to as a waste reservoir). That is, the sample being introduced and adhering to the trap column does not necessarily have exactly the same composition as the original sample. The same applies to the sample which is supplied from the trap column to a separation column. E.g., depending on the type of solvent used, only some constituents of the sample adhering to the trap column may be introduced to the separation column. For sake of brevity and simplicity of description, however, all of the above will simply be referred to as "the sample"—although it is clear to the skilled person that the sample originally introduced into a system carrying out the described method does not necessarily correspond to 100% to the sample that is supplied to the separation column and subsequently analyzed.

The method may further comprise the metering device sucking in the sample from a sample reservoir, wherein sucking in the sample from a sample reservoir precedes the step of pushing the sample into the trap column. That is, in other words, the method comprises the sample being sucked up by means of the metering device and then being brought into the trap column by means of the metering device. It should be noted that the step of the sample being brought into the trap column may be performed directly after the sample is sucked in. However, in some embodiments, there may also be one or more additional steps between sucking in the sample and bringing the sample into the trap column.

The liquid chromatography system may further comprise a separation column and the method may further comprise fluidly connecting the trap column to the separation column and pushing the sample from the trap column to the separation column.

The sample may be pushed into the trap column in a first flow direction and the sample may be pushed from the trap column to the separation column in a second flow direction, which second flow direction is opposite to the first flow direction. That is, the sample may be brought into the separation column in a direction opposite to the direction in which the sample was introduced into the trap column. This configuration may also be referred as "backward flush". In some instances, such a backward flush may be advantageous, as the sample introduced into the separation column does not have to travel through the complete trap column.

The sample may be pushed into the trap column in a first flow direction and the sample may be pushed from the trap column to the separation column in a second flow direction, which second flow direction is in the same direction as the first flow direction. This state may also be referred to as "forward flush". That is, any constituents of the sample introduced into the separation column has passed through the complete length of the trap column. This may lead to a purer sample, which may be advantageous in some instances.

The method may further comprise pressurizing the trap column to a first pressure, while the trap column is isolated from ambient atmosphere, wherein the step of pressurizing the trap column to the first pressure is performed before the trap column is fluidly connected to the separation column. That is, the trap column may be pre-pressurized, e.g., to the analytical pressure. This may prevent (or decrease) the occurrence of sudden pressure spikes at the trap column fluidly connected to the trap column, thereby decreasing sample dispersion and wear on these systems. Thus, the system's service life may be increased.

The liquid chromatography system may comprise an analytical pump and wherein the method further comprises fluidly connecting the trap column to the analytical pump and wherein the analytical pump pushes the sample from the trap column to the separation column.

The step of pressurizing the trap column to the first pressure may be performed before the trap column is fluidly connected to the analytical pump.

The first pressure may exceed the ambient pressure by at least 10 bar, preferably at least 100 bar, more preferably at least 500 bar.

The metering device may pressurize the trap column. That is, the metering device causes a positive pressure in the trap column. In other words, the metering device is not only used to introduce the sample into the trap column, but also to pressurize the trap column. Again, in prior art devices, an additional pump may have been used for this purpose and again, by integrating this additional functionality into the metering device, there are less parts used, thereby rendering the system less complex.

The liquid chromatography system may further comprise a waste and the method may further comprise fluidly connecting the trap column to the waste and causing a fluid flow from the trap column to the waste.

The metering device may cause the fluid flow from the trap column to the waste. Once more, having this functionality also in the metering device may decrease the complexity of the system used.

The method may further comprise depressurizing the trap column from an elevated pressure to a reduced pressure before the trap column is fluidly connected to the waste. Such a controlled decompression may be advantageous, as it leads to less abrasion than could occur if no such controlled decompression was performed. Furthermore, the controlled decompression also prevent fluids from rapidly exiting the system (potentially being harmful to a user) and lowers the risk of constituents outgassing in the fluid in the system.

The elevated pressure may exceed the reduced pressure by at least 10 bar, preferably at least 100 bar, more preferably at least 500 bar.

The metering device may depressurize the trap column from the elevated pressure to the reduced pressure. Again, having this additional functionality performed by the metering device may result in a less complex and more fail-safe system.

The metering device may comprise a first port and a second port and the method may comprise fluidly connecting the metering device by means of the first port with a first solvent reservoir and the metering device sucking in solvent from the first solvent reservoir.

The step of the metering device sucking in solvent from the first solvent reservoir may be performed after the metering device pushes the sample into the trap column.

The step of the metering device sucking in solvent from the first solvent reservoir may also performed before the metering device pushes the sample into the trap column. That is, in this embodiment, solvent is sucked into the metering device both before and after the sample is pushed to the trap column. That is, these steps may be performed iteratively: First, solvent may be sucked into the metering device. Then, the sample may be introduced into the trap column. Then, more solvent may be introduced into the trap column.

The metering device may be fluidly connected to a sample pick up means by means of the second port and the method may comprise the sample pick up means being moved to the solvent reservoir and the first port may be fluidly connected to a dead end when the sample is sucked in.

Put differently, the first port is not fluidly connected to a solvent reservoir when the sample is sucked in.

The liquid chromatography system may comprise a sample pick up means seat, a first distributor valve and a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to the waste, one port is directly fluidly connected to a first solvent reservoir and one port is directly fluidly connected to the metering device.

In this document, a fluid connection (or two elements being fluidly connected to one another) means that fluid may flow from one element to another. A port of a valve being directly fluidly connected to another element should be construed to mean that the port is fluidly connected to the other element in such a manner that there is no other valve port interposed between the port of the valve and the other element.

Another port of the second distributor valve may be directly fluidly connected to a second solvent reservoir.

The sample pick up means may be a needle.

The metering device may comprise a housing and a piston.

In a further embodiment, the present invention relates to a system for use in liquid chromatography. The system comprises a trap column and a metering device. The system is adapted to assume a configuration allowing the metering device to push a sample into the trap column and the metering device is adapted to push the sample into the trap column in this configuration.

That is, the system is adapted to perform the method of the invention. Thus, a system is provided requiring less parts for its functionality, leading to a less complex, more reliable, more failsafe and smaller system.

The system may be adapted to assume a configuration allowing the sample to be sucked into the system by means of the metering device.

The system may further comprise a sample pick up means fluidly connected to the metering device. The sample pick up means may be a needle.

The system further may comprise a seat for receiving the sample pick up means.

The system may further comprise a separation column and an analytical pump adapted to push the sample towards and through the separation column.

The system may further comprise a waste.

The system may further comprise a first solvent reservoir.

The system may further comprise a second solvent reservoir.

The system may further comprise a first distributor valve and a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to the waste, one port is directly fluidly connected to a first solvent reservoir and one port is directly fluidly connected to the metering device.

Another port of the second distributor valve may be directly fluidly connected to the second solvent reservoir.

The system may be adapted for high pressure liquid chromatography, and preferably for pressures exceeding 1000 bar.

The metering device may comprise a first port and a second port to fluidly connect to other components.

The metering device may be fluidly connected to the first distributor valve by means of the second port and fluidly connected to the second distributor valve by means of the first port.

The system may not comprise any pump other than the metering device to introduce the sample into the trap column.

The system may be adapted to carry out the method recited herein.

The present invention also relates to a use of the system discussed above for liquid chromatography and in particular for high pressure liquid chromatography.

Also this use provides the usage of an improved system and/or an improved method in liquid chromatography. That is, liquid chromatography may be carried out in a more fail-safe, more economic manner by using less space than compared to what was required before.

In particular, the present invention also relates to a use of the system to carry out the method as recited herein.

The metering device may be used to push the sample into the trap column.

The metering device may be used to suck in the sample.

The metering device may be used to pressurize the trap column before the trap column is fluidly connected to the separation column.

The metering device may be used to depressurize the trap column from an elevated pressure to a reduced pressure.

The metering device may be used to cause a fluid flow from the trap column to a waste.

The metering device may be used to suck in solvent.

That is, the described invention uses the metering device in multiple ways: First, it is responsible for the precise sample collection, then it conveys the sample into the trap column. The metering device is thus used as both a sample collector and a pump. In some embodiments, the metering device may have a volume too limited to achieve the sample loading in one step. In such embodiments, the loading flow may be interrupted, the metering device is filled again, and only then the loading is continued. As discussed, after loading, the metering device may pre-compress the sample, and, after injection, the metering device may wash (purge). In one position (which may be referred to as the bypass position), for example during the equilibrium phase, the metering device may also rinse the trap column.

That is, to summarize, the metering device may have the following four functions: sample measuring, pre-compressing the trap column, providing the loading flow (if needed, with different solvents) and washing (if needed, with different solvents). The integration of further functions in the metering device saves costs and space. The reduction of the number of components facilitates maintenance and reduces the complexity of the system.

The invention is also defined by the following numbered embodiments:

Below, method embodiments will be discussed. These embodiments are abbreviated by the letter "M" followed by a number. When reference is herein made to a method embodiment, those embodiments are meant.

M1. A method performed in a liquid chromatography system, the method comprising a metering device pushing a sample into a trap column.

In other words, the metering device causes a positive pressure which causes the sample to be transferred (from another component) to the trap column.

It will be understood that the sample may be a liquid sample. As will further be understood, when the sample is introduced into the trap column, some constituents of the sample will adhere to the trap column while other constituents may not adhere and may flow through the trap column and go to waste (which may also be referred to as a waste reservoir). That is, the sample being introduced and adhering to the trap column does not necessarily have exactly the same composition as the original sample. The same applies to the sample which is supplied from the trap column to a separation column. E.g., depending on the type of solvent used, only some constituents of the sample adhering to the trap column may be introduced to the separation column. For sake of brevity and simplicity of description, however, all of the above will simply be referred to as "the sample"—although it is clear to the skilled person that the sample originally introduced into a system carrying out the described method does not necessarily correspond to 100% to the sample that is supplied to the separation column and subsequently analyzed.

M2. The method in accordance with the preceding embodiment, wherein the method further comprises the metering device sucking in the sample from a sample reservoir, wherein sucking in the sample from a sample reservoir precedes the step of pushing the sample into the trap column.

M3. The method in accordance with any of the preceding embodiments, wherein the liquid chromatography system comprises a separation column and wherein the method further comprises fluidly connecting the trap column to the separation column and pushing the sample from the trap column to the separation column.

M4. The method in accordance with any of the preceding embodiments, wherein the sample is pushed into the trap column in a first flow direction and wherein the sample is pushed from the trap column to the separation column in a second flow direction, which second flow direction is opposite to the first flow direction.

M5. The method in accordance with embodiment M3, wherein the sample is pushed into the trap column in a first flow direction and wherein the sample is pushed from the trap column to the separation column in a second flow direction, which second flow direction is in the same direction as the first flow direction.

M6. The method in accordance with any of the preceding embodiments with the features of embodiment M3, wherein the method further comprises pressurizing the trap column to a first pressure, while the trap column is isolated from ambient atmosphere, wherein the step of pressurizing the trap column to the first pressure is performed before the trap column is fluidly connected to the separation column.

M7. The method in accordance with any of the preceding embodiments with the features of embodiment M3, wherein the liquid chromatography system comprises an analytical pump and wherein the method further comprises fluidly connecting the trap column to the analytical pump and wherein the analytical pump pushes the sample from the trap column to the separation column.

M8. The method with the features of the two preceding embodiments, wherein the step of pressurizing the trap column to the first pressure is performed before the trap column is fluidly connected to the analytical pump.

M9. The method in accordance with any of the preceding embodiments with the features of embodiment M6, wherein the first pressure exceeds ambient pressure by at least 10 bar, preferably at least 100 bar, more preferably at least 500 bar.

M10. The method in accordance with any of the preceding embodiments with the features of embodiment M6, wherein the metering device pressurizes the trap column.

That is, the metering device causes a positive pressure in the trap column.

M11. The method in accordance with any of the preceding embodiments, wherein the liquid chromatography system further comprises a waste and wherein the method further comprises fluidly connecting the trap column to the waste and causing a fluid flow from the trap column to the waste.

M12. The method in accordance with the preceding embodiment, wherein the metering device causes the fluid flow from the trap column to the waste.

M13. The method in accordance with any of the two preceding embodiments, wherein the method further comprises depressurizing the trap column from an elevated pressure to a reduced pressure before the trap column is fluidly connected to the waste.

M14. The method in accordance with the preceding embodiment, wherein the elevated pressure exceeds the reduced pressure by at least 10 bar, preferably at least 100 bar, more preferably at least 500 bar.

M15. The method in accordance with any of the two preceding embodiments, wherein the metering device depressurizes the trap column from the elevated pressure to the reduced pressure.

M16. The method in accordance with any of the preceding embodiments, wherein the metering device comprises a first port and a second port and wherein the method comprises fluidly connecting the metering device by means of the first port with a first solvent reservoir and the metering device sucking in solvent from the first solvent reservoir.

M17. The method in accordance with the preceding embodiment, wherein the step of the metering device sucking in solvent from the first solvent reservoir is performed after the metering device pushes the sample into the trap column.

M18. The method in accordance with the preceding embodiment, wherein the step of the metering device sucking in solvent from the first solvent reservoir is also performed before the metering device pushes the sample into the trap column.

That is, in this embodiment, solvent is sucked into the metering device both before and after the sample is pushed to the trap column.

M19. The method in accordance with any of the preceding 3 embodiments and with the features of embodiment M2, wherein the metering device is fluidly connected to a sample pick up means by means of the second port and wherein the method comprises the sample pick up means being moved to the solvent reservoir and wherein the first port is fluidly connected to a dead end when the sample is sucked in.

Put differently, the first port is not fluidly connected to a solvent reservoir when the sample is sucked in.

M20. The method in accordance with any of the preceding embodiments with the features of embodiments M3, M7, M11, M16, wherein the liquid chromatography system comprises a sample pick up means seat, a first distributor valve and a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to the waste, one port is directly fluidly connected to a first solvent reservoir and one port is directly fluidly connected to the metering device.

In this document, a fluid connection (or two elements being fluidly connected to one another) means that fluid may flow from one element to another. A port of a valve being directly fluidly connected to another element should be construed to mean that the port is fluidly connected to the other element in such a manner that there is no other valve port interposed between the port of the valve and the other element.

M21. A method in accordance with the preceding embodiment, wherein another port of the second distributor valve is directly fluidly connected to a second solvent reservoir.

M22. A method in accordance with any of the preceding embodiments with the features of embodiment M19, wherein the sample pick up means is a needle.

M23. A method in accordance with any of the preceding embodiments, wherein the metering device comprises a housing and a piston.

Below, system embodiments will be discussed. These embodiments are abbreviated by the letter "S" followed by a number. When reference is herein made to a system embodiment, those embodiments are meant.

S1. A liquid chromatography system comprising a trap column and a metering device, wherein the system is adapted to assume a configuration allowing the metering device to push a sample into the trap column and wherein the metering device is adapted to push the sample into the trap column in this configuration.

S2. The liquid chromatography system in accordance with the preceding embodiment, wherein the system is adapted to assume a configuration allowing the sample to be sucked into the system by means of the metering device.

S3. The liquid chromatography system in accordance with any of the preceding system embodiments, wherein the system further comprises a sample pick up means fluidly connected to the metering device.

S4. The liquid chromatography system in accordance with the preceding embodiment, wherein the sample pick up means is a needle.

S5. The liquid chromatography system in accordance with any of the preceding two embodiments, wherein the system further comprises a seat for receiving the sample pick up means.

S6. The liquid chromatography system in accordance with any of the preceding system embodiments, wherein the system further comprises a separation column and an analytical pump adapted to push the sample towards and through the separation column.

S7. The liquid chromatography system in accordance with any of the preceding system embodiments, wherein the system further comprises a waste.

S8. The liquid chromatography system in accordance with any of the preceding system embodiments, wherein the system further comprises a first solvent reservoir.

S9. The liquid chromatography system in accordance with the preceding embodiment, wherein the system further comprises a second solvent reservoir.

S10. The liquid chromatography system in accordance with any of the preceding system embodiments with the features of embodiments S5, S6, S7 and S8, wherein the system further comprises a first distributor valve and a second distributor valve, wherein each distributor valve comprises a plurality of ports and a plurality of connecting elements for changeably connecting the ports of the respective distributor valve, wherein as regards the first distributor valve, one port is directly fluidly connected to the seat, two ports are directly fluidly connected to the trap column, one port is directly fluidly connected to the separation column, one port is directly fluidly connected to the analytical pump and one port is directly fluidly connected to the second distributor valve; and as regards the second distributor valve, one port is directly fluidly connected to the first distributor valve, one port is directly fluidly connected to the waste, one port is directly fluidly connected to a first solvent reservoir and one port is directly fluidly connected to the metering device.

S11. The liquid chromatography system in accordance with the preceding embodiment and with the features of embodiment S9, wherein another port of the second distributor valve is directly fluidly connected to the second solvent reservoir.

S12. The liquid chromatography system in accordance with any of the preceding system embodiments, wherein the system is adapted for high pressure liquid chromatography, and preferably for pressures exceeding 1000 bar.

S13. The liquid chromatography system in accordance with any of the preceding system embodiments, wherein the metering device comprises a first port and a second port to fluidly connect to other components.

S14. The liquid chromatography system in accordance with the preceding embodiment and the features of embodiment S10, wherein the metering device is fluidly connected to the first distributor valve by means of the second port and fluidly connected to the second distributor valve by means of the first port.

S15. The liquid chromatography system in accordance with any of the preceding system embodiments, wherein the system does not comprise any pump other than the metering device to introduce the sample into the trap column.

S16. The liquid chromatography system in accordance with any of the preceding system embodiments, wherein the system is adapted to carry out the method recited in any of the preceding method embodiments.

S17. The liquid chromatography system in accordance with any of the preceding system embodiments, wherein the metering device comprises a housing and a piston.

Below, use embodiments will be discussed. These embodiments are abbreviated by the letter "U" followed by a number. When reference is herein made to a use embodiment, those embodiments are meant.

U1. Use of the liquid chromatography system in accordance with any of the preceding system embodiments for liquid chromatography, in particular of high pressure liquid chromatography.

U2. Use in accordance with the preceding embodiment to carry out the method as recited in any of the preceding method embodiments.

U3. Use in accordance with any of the preceding use embodiments, wherein the metering device is used to push the sample into the trap column.

U4. Use in accordance with any of the preceding use embodiments, wherein the metering device is used to suck in the sample.

U5. Use in accordance with any of the preceding use embodiments, wherein the metering device is used to pressurize the trap column before the trap column is fluidly connected to the separation column.

U6. Use in accordance with any of the preceding use embodiments, wherein the metering device is used to depressurize the trap column from an elevated pressure to a reduced pressure.

U7. Use in accordance with any of the preceding use embodiments, wherein the metering device is used to cause a fluid flow from the trap column to a waste.

U8. Use in accordance with any of the preceding use embodiments, wherein the metering device is used to suck in solvent.

BRIEF DESCRIPTION OF THE DRAWINGS

The present invention will now be described with reference to the accompanying drawings which illustrate embodiments of the invention, without limiting the scope of the invention.

It is noted that not all of the drawings carry all the reference signs. Instead, in some of the drawings, some of the reference signs have been omitted for sake of brevity and simplicity of illustration.

DETAILED DESCRIPTION OF EMBODIMENTS

Figure 1:
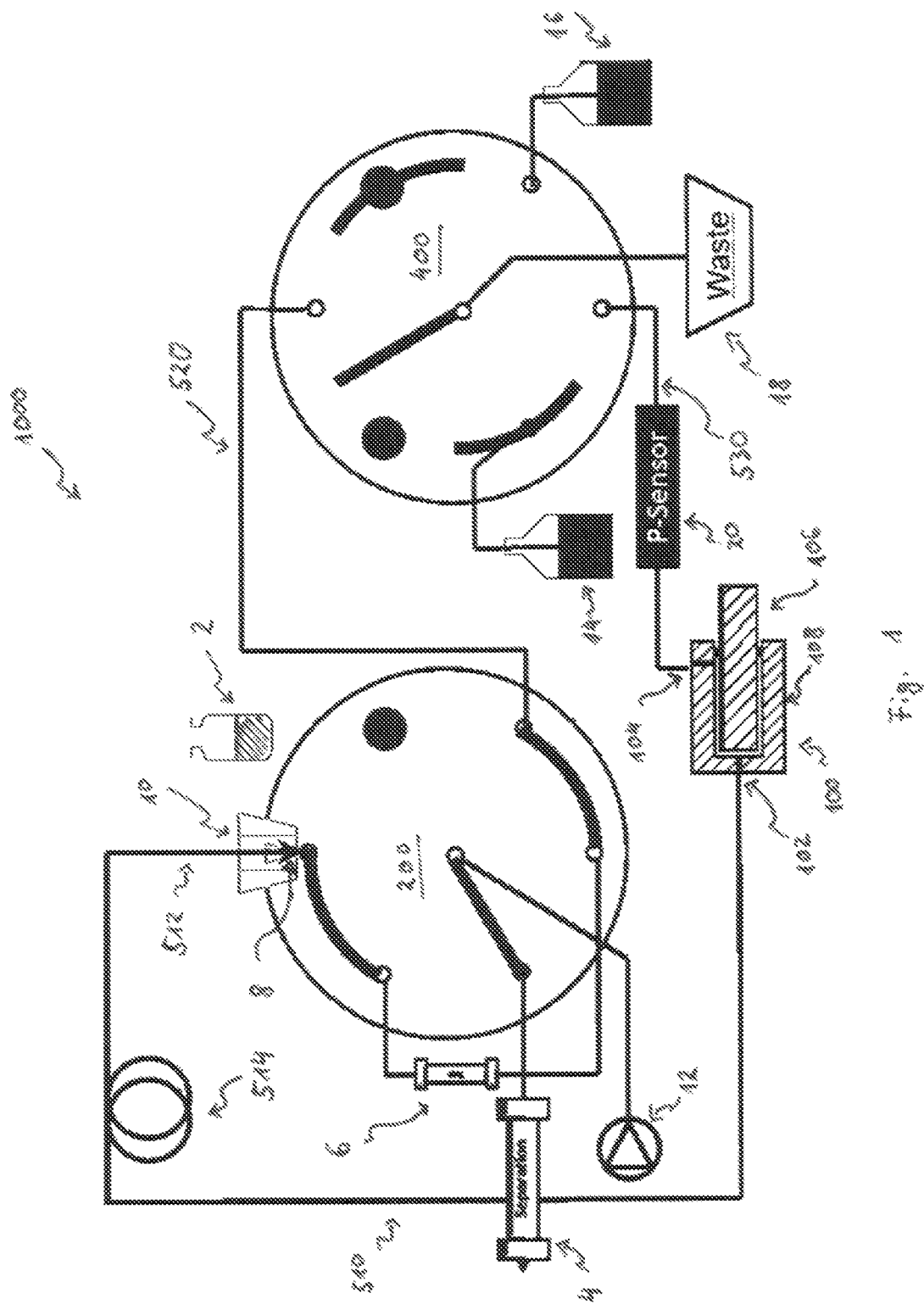
FIG. 1 depicts a liquid chromatography system of a first embodiment according to the present invention in a first configuration.

FIG. 1 schematically depicts a liquid chromatography ("LC") system 1000 in accordance with an embodiment of the present technology. In particular, the liquid chromatography system 1000 can be a high pressure liquid chromatography system 1000 (also referred to as a high performance liquid chromatography system 1000 or abbreviated HPLC system), that is a system adapted to be employed with pressures exceeding 100 bar, preferably exceeding 1.000 bar, such as 1.500 bar. To perform a LC, in essence, a sample contained in a sample container or sample reservoir 2 has to be transferred into a separation column 4. Different constituents of the sample adhere differently to the separation column 4. Thus, when an analytical pump 12 causes the sample to flow through the separation column 4, the different constituents of the sample will leave the separation column 4 at different times, allowing the constituents to be subsequently detected.

In some embodiments, the present technology is directed to introducing the sample into the separation column 4. In essence, this is achieved by a sample pick up means 8 (such as a needle 8) of the LC system 1000 being inserted into the sample reservoir 2 (see FIG. 4) and a suction being supplied to a tubing 510 connecting the needle 8 and a metering device 100. Such suction can be supplied to said tubing 510 by a piston 106 of the metering device 100 retracting out of a housing 108 of the metering device 100 (that is, the metering device 100 may be used to suck in the sample). Thus, a sample can be sucked from the sample reservoir 2 into the needle 8. In some embodiments, the sample may also be sucked into a tubing end section 512, which tubing end section 512 is adjacent to the needle 8. The tubing end section 512 may also be referred to as the sample loop 512. The needle 8 can subsequently be seated into a seat 10 which will also be referred to as a needle seat 10 (see FIG. 5), and the sample can be pushed onto a trap column 6. Pushing the sample onto the trap column 6 can be performed by the metering device 100, more particularly by the piston 106 of the metering device 100 being moved forward. By switching a distributor valve 200 into an appropriate position (see the alternatives of FIGS. 7a and 7b), the trap column 6 can be fluidly connected to the separation column 4. In such a state, the analytical pump 12 can cause the sample to flow from the trap column 6 to the separation column 12.

In one embodiment, the present technology is directed to using the metering device 100 for multiple tasks and/or steps. In prior art systems, a metering device was typically used to measure and suck in the sample. These tasks are also performed by the metering device 100 of the present technology. However, the metering device 100 of the present technology may also be used for additional and more versatile tasks. Thus, additional components (which have until now been necessary) may be omitted, thereby reducing the complexity of the system and saving space.

As laid out above, the metering device 100 may, for example, also be used to push the sample from the tubing end section 512 to the trap column 6 (also see configuration in FIG. 5)—thus, an additional pump which has until now been necessary to push the sample into the trap column 6 may be omitted. Alternatively or additionally, the metering device 100 may be used to precompress (that is, to pressurize) the sample that is present in the trap column 6 (see the configuration depicted in FIG. 6) and/or to correspondingly decompress (i.e., depressurize) the trap column 6 before it is fluidly connected to waste 18, which typically is at atmospheric pressure—see FIG. 8 for decompression and FIG. 9 for fluid connection between trap column 6 and waste 18.

Any of these tasks may be performed by the metering device 100, thereby reducing the complexity of the system 1000. The reduced complexity may lead to increased fail safety. Furthermore, the corresponding system may be simpler to service (as there are less components to service).

In the above, the general setup of one embodiment of the present technology has been described. In some embodiments, the described trap column 6 may be of some relevance for the present technology. The trap column 6 is used to preconcentrate the sample: Instead of injecting the sample directly into the separation column, the sample is first guided to the trap column 6, where the constituents to be analyzed may adhere. These constituents may then be separated for further assessment by an appropriate fluid being pumped through the trap column 6 by means of the analytical pump 12. It will be understood that when introducing the sample from the trap column 6 into the separation column 4, the sample and the section of the system 1000 being fluidly connected to the separation column 4 will be at analytical pressure, i.e. at the pressure at which the separation is performed. As discussed, this may be a pressure of several hundred bar, or even a pressure exceeding 1.000 bar. It will be understood that after the sample has been introduced into the trap column 6 (see FIG. 5), the trap column 6 is typically not yet at the analytical pressure. Instead, in this state (see FIG. 5), the section of the system 1000 being fluidly connected to the trap column 6 comprises the following: metering device 100, tubing 510 connecting the metering device 100 to the needle 8, needle 8, trap column 6, tubing 520 connecting distributor valves 200 and 400 and waste 18.

In this section and in this state or configuration, there may be atmospheric or ambient pressure, i.e. a pressure sufficiently below the analytical pressure.

Figure 7A:
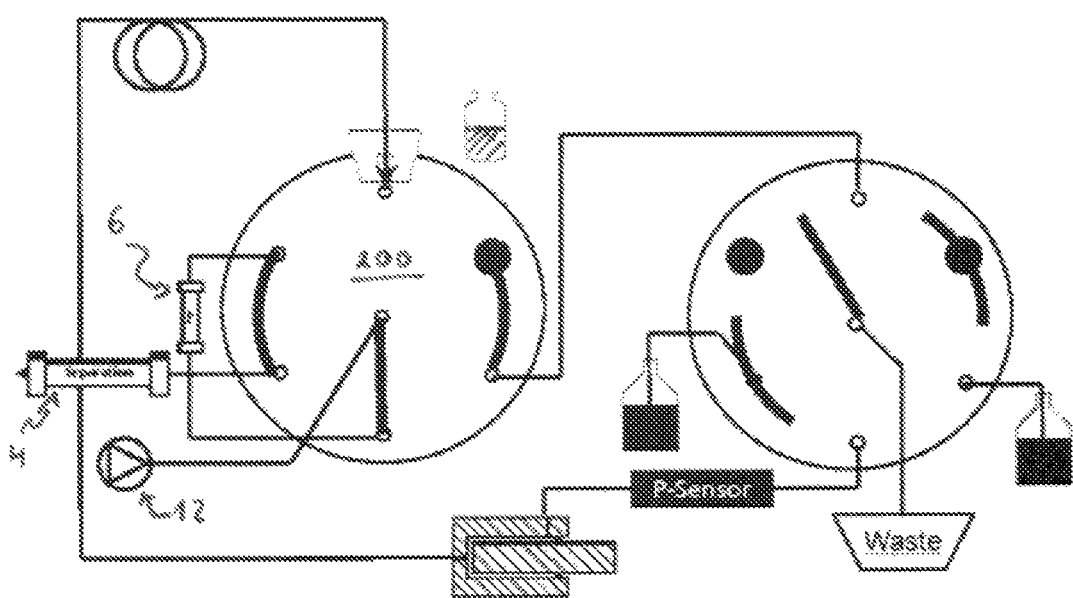
FIG. 7a depicts the system of FIG. 1 in a sixth configuration (which may be referred to as the "backward flush injection state")
Figure 7B:
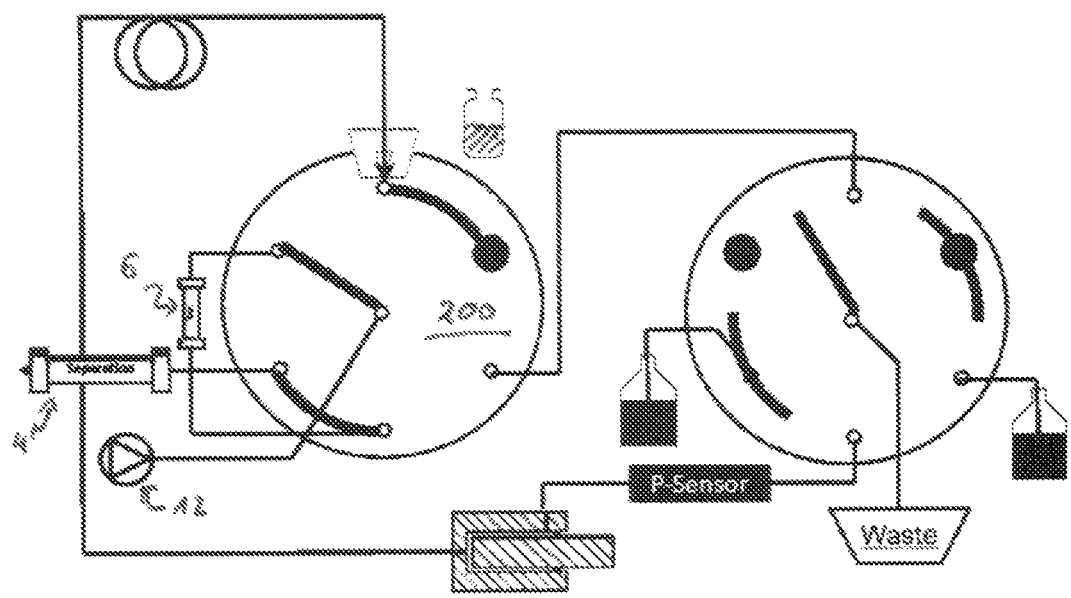
FIG. 7b depicts the system of FIG. 1 in a seventh configuration (which may be referred to as the "forward flush injection state")

In principle, after the sample has been transferred into the trap column 6 (see FIG. 5), one could immediately switch the system 1000 to one of the states depicted in FIGS. 7a and 7b, that is to a state where the sample is transferred from the trap column 6 to the separation column 4. Thus, the pump 12 would have to bring the trap column 6 and the separation column 4 to the analytical pressure.

However, in the depicted embodiment of the present technology, the trap column 6 may also be pressurized before it is fluidly connected to the separation column 4. This is depicted in FIG. 6. Here, the section of the system 1000 being fluidly connected to the trap column 6 comprises the following: metering device 100, tubing 510 connecting the metering device 100 to the needle 8, needle 8, trap column 6, tubing 520 connecting distributor valves 200 and 400. However, in contrast to the configuration depicted in FIG. 5, the tubing 520 is not connected to the waste 18. Instead, the distributor valve 400 is set such that tubing 520 includes a "dead end". In this state, the piston 106 of the metering device 100 may be moved forward to pressurize the section of the system 1000 being fluidly connected to the trap column 6 and hence also the trap column 6. Thus, this section may be brought to an elevated pressure and particularly to the analytical pressure before the trap column 6 is fluidly connected to the separation column 4. This may be advantageous for various reasons: The trap column 6 may be brought to an elevated pressure (e.g., to the analytical pressure) in a controlled manner, thereby preventing pressure spikes at the trap column 6 that could occur otherwise and that could damage the trap column. Further, the separation column 4 can be maintained at elevated pressures (e.g., at the analytical pressure). That is, instead of having to pressurize both the trap column 6 and the separation column 4 after these two columns have been fluidly connected to one another, the trap column 6 is connected to the separation column 4 when both of them are pressurized. This also prevents the separation column 4 from being subjected to pressure alterations and pressure spikes. This may reduce the wear on the components and increase the lifetime of the components and the overall system. Further, not having pressure spikes also reduced the likelihood of the sample being mixed with solvent, i.e., dispersion. Having a less dispersed sample leads to a more defined peak in subsequent analysis, thereby resulting in an improved analysis.

Figure 2:
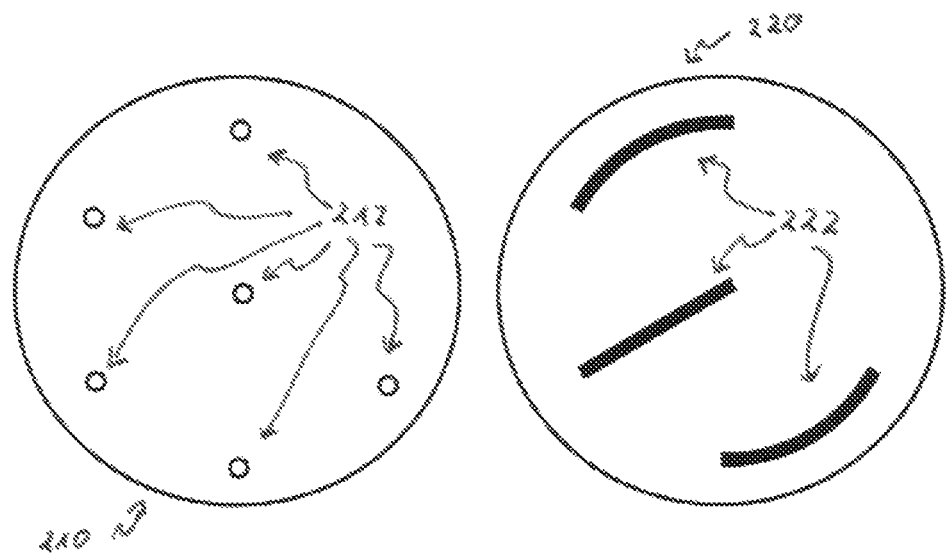
FIG. 2 depicts components of a distributor valve employed in embodiments of the present invention.

The embodiment of the present technology depicted in the Figures will now be described in greater detail. FIG. 1 depicts the liquid chromatography system 1000. The system comprises a sample reservoir 2 including a sample to be analyzed, a trap column 6, a separation column 4, an analytical pump 12, a metering device 100, a sample pick up means 8 (which is here realized as a needle 8), a seat 10 (which is here realized as a needle seat 10), solvent reservoirs 14, 16, a waste 18, tubing interconnecting different elements of the system 1000, as well as two distributor valves 200, 400. In some embodiments, the tubing may be realized as capillaries. The distributor valves 200, 400 can be set to different states to switch the connection between different elements. One exemplary realization of a distributor valve 200 is depicted in FIG. 2. Each distributor valve 200 may comprise a stator 210 and a rotor 220. The stator 210 may comprise ports 212 to which different elements may be connected (e.g., in the embodiment depicted in FIG. 1, each of the needle seat 10, the analytical pump 12, the separation column 4 and the tubing 520 to the other distribution valve 400 is fluidly connected to one port of the distributor valve 200, respectively, and the trap column 6 is fluidly connected to two ports of this distributor valve 200). The rotor 220 may comprise connecting elements 222, such as grooves 222, that may interconnect different ports 212 of the stator element 210. For example, FIG. 1 depicts a configuration where each connecting element 222 of the rotor of the left distribution valve 200 interconnects two ports of said distribution valve, respectively, while the stator and the rotor of the second distribution valve 400 are in such a configuration that none of the ports in the second distribution valve are connected to one another. It will be understood that whenever two elements are described to be connected to one another, this denotes a fluid connection, i.e., a connection where a fluid may flow from one element to the other, unless otherwise specified or unless clear to the skilled person that something different is meant. Furthermore, also the term "directly fluidly connected" will be used herein. A direct fluid connection denotes a fluid connection between a port of a valve and another element, when there is no further valve port present in this connection, i.e. in the way between said port of a valve and the other element. For example, in the configuration depicted in FIG. 1, analytical pump 12 is directly fluidly connected to the central port of the left valve 200. This analytical pump 12 is fluidly connected to the separation column 4, however, the fluid connection between the analytical pump 12 and the separation column 4 is not a direct one, as there are two valve ports in the fluid way between the analytical pump 12 and the separation column 4. FIG. 1 also depicts blind plugs 230, 430. In the embodiments depicted in FIG. 1, valve 200 comprises one bling plug 230 and valve 400 comprises two blind plugs 430. Blind plugs 230, 430 may be used to close off ports in the distributor valves 200, 400. Thus, the distributor valves 200, 400 may be identical to one another (and one differ by the use of the blind plugs 230, 430), which may simplify the productions process. More particularly, in the embodiment depicted in FIG. 1, each distribution valve 200, 400 comprises 7 ports, however, two ports of the right distribution valve 400 and one port of the left distribution valve 200 are closed off by the discussed bling plugs 230, 430. The system 1000 may also comprise a pressure sensor 20. The pressure sensor 20 may be fluidly connected to the metering device 100 (e.g., it may be disposed between metering device 100 and the second switching valve 400).

In FIG. 1, the system or setup 1000 is in an idle position: flow of the analytical pump 12 is passed through the first valve 200 directly to the separation column 4. The needle 8 is in the needle seat 10. The right valve 400, which valve 400 is responsible for the selection of trap fluids and for providing the Compress position, is set here to "Compress". That is, the valve 400 is set such that the tubing section 520 connecting the first valve 200 to the second valve 400 includes a "dead end".

Figure 3:
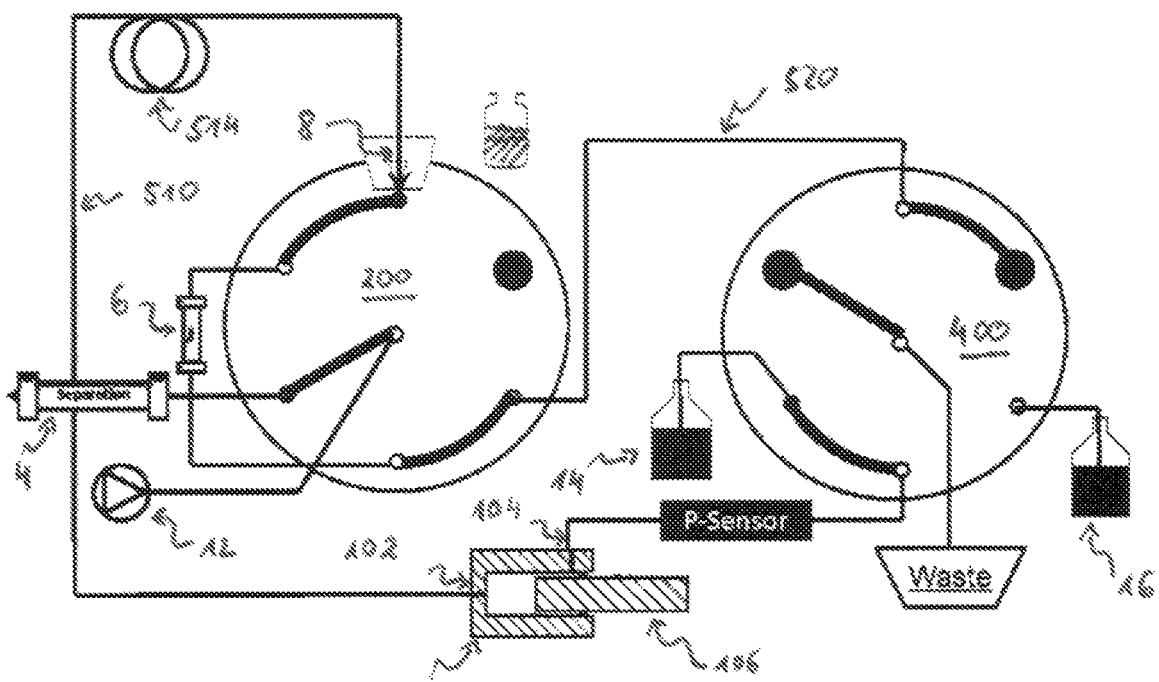
FIG. 3 depicts the system of FIG. 1 in a second configuration (which may be referred to as the "idle state")

FIG. 3 depicts how the metering device 100 may get filled with a first portion of trap solvent. The metering device 100 has two connection ports 102, 104, which are also referred to as first connection port 104 and second connection port 102. The right valve 400 connects port 102 of the metering device 100 (which port 102 may also be referred to as an input) with a solvent reservoir 14. The other side, i.e., the other connection port 104 of the metering device 100 is closed over the tubing 510 connecting the metering device 100 and the needle 8, which tubing 510 may include a buffer loop 514, the needle seat 10, the trap column 6, the first valve 200, tubing 520 and the second valve 400. The buffer loop 514 may provide an additional length of tubing to allow movement of the needle 8. In the depicted position, the piston 106 of the metering device 100 can pull back while raising solvent from solvent reservoir 14. It is noted that valve 400 may also be switched to such a position that, instead, solvent may be supplied from solvent reservoir 16 to the metering device 100. That is, in simple words, FIG. 3 depicts a configuration where trap solvent may be supplied to the metering device 100 from solvent reservoir 14. Furthermore, there may also be a fluid flow from the analytical pump 12 through the separation column in this configuration. That is, in the configuration of FIG. 3, the metering device 100 may fill itself with a solvent.

Figure 4:
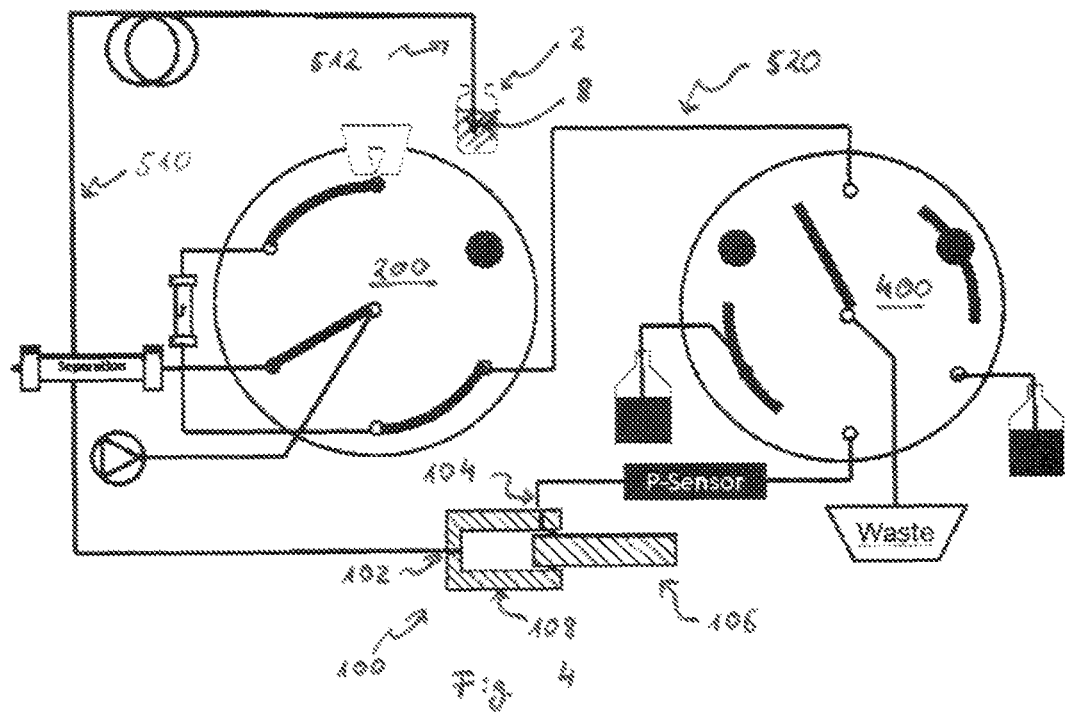
FIG. 4 depicts the system of FIG. 1 in a third configuration (which may be referred to as the "sample pick up state")

FIG. 4 depicts a configuration where the right valve 400 again enters the compress position, i.e., the state where the metering device 100 is closed at port 104, i.e. where this port 104 is connected to a dead end. More particularly, in the configuration depicted in FIG. 4, the tubing 520 interconnecting the valves 200 and 400 includes a dead end. The metering device 100 is first closed at both ports 102, 104, or, in other words, in the front and in the back—that is, both ports 102, 104 are connected to "dead ends", though it is noted that the connection of port 102 to a dead end is optional. The needle 2 may be moved to the sample reservoir 2 and the port 102 of the metering device 100, which port 102 connects the metering device to the tubing 510, may be opened—i.e. the tubing 510 does no longer lead to a dead end, but to sample reservoir 2. That is, the metering device 100 may be opened via the buffer loop. As the piston 106 of the metering device 100 moves back, the sample is drawn up into the needle 8 and optionally also into the tubing section 512 adjacent to the needle 8. That is, the metering device 100 may suck in the sample.

Figure 5:
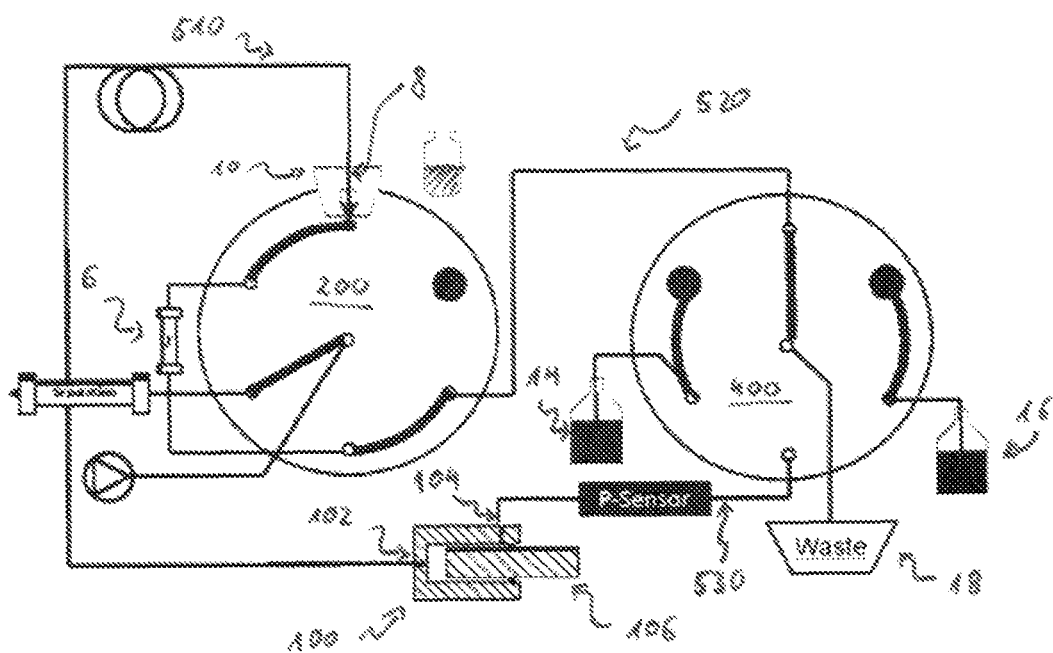
FIG. 5 depicts the system of FIG. 1 in a fourth configuration (which may be referred to as the "trapping state")
Figure 6:
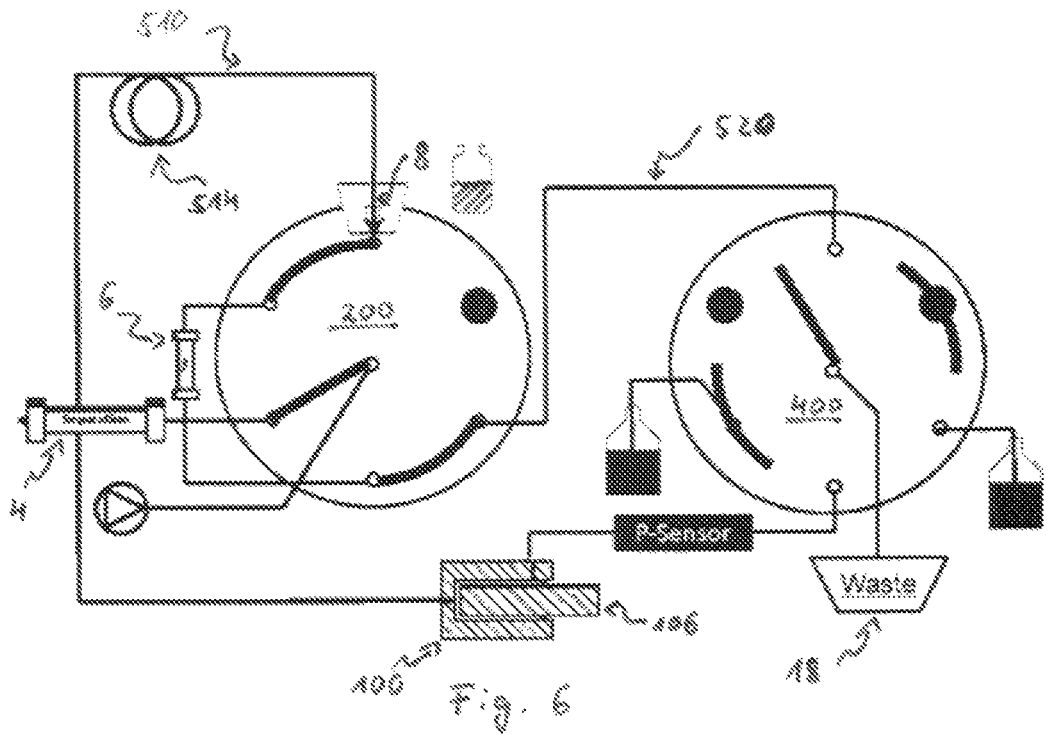
FIG. 6 depicts the system of FIG. 1 in a fifth configuration (which may be referred to as the "pre-pressurize state")

FIG. 5 depicts how after the sample is drawn, the needle 8 returns to the needle seat 10. The right valve 400 connects a side of the trap column 6 facing away from the sample with the waste 18. In this position, the piston 106 of the metering device 100 can move forward and therefore push the sample with the previously raised trap solvent to the trap column 6. Components which do not adhere to the trap column 6 get pushed out to waste 18. That is, the metering device is used to push the sample into the trap column 6, which may also be referred to as "loading" of the trap column 6. This process may be repeated if the right valve 400 again connects the port 104 (which may also be referred to as the rear output) of the metering device 100 with the solvent reservoirs 14 or 16 and therefore allows the metering device 100 to raise fresh trap solvent. That is, more trap solvent may be introduced into the section of the system fluidly connected to the trap column 6 in FIG. 5. To do so, valve 400 is moved to connect tubing 530 to solvent reservoir 14 or 16 (that is the configuration of valve 400 in FIG. 3), thereby "opening" port 104, which is no longer connected to a dead end, and port 102 of metering device 100 is "closed" (i.e., it is connected to a dead end). When the piston 106 is moved back in such a configuration, solvent is drawn from the solvent reservoir 14 (or 16) into the metering device 100. Subsequently, port 104 can be closed (i.e., connected to a dead end) and port 102 be opened (i.e., not connected to a dead end). Then, piston 106 may be moved forward to supply the solvent into tubing section 510 to thereby supply more solvent (and potentially also more sample if there are any residues in the tubing) towards the trap column 6. This process may also be referred to as trapping (and retrapping) the sample.

FIG. 6 depicts the configuration where the sample that has been trapped on the trap column 6 and the components that are fluidly connected to the trap column 6 are pressurized (or "precompressed"). The right valve 400 switches back to the compress position, i.e., to the position where tubing 520 has a dead end. In the depicted configuration, the trap column 6 is fluidly connected to two dead ends, i.e., it is not connected to the ambient atmosphere. In other words, it is isolated from the ambient atmosphere. The piston 106 in the metering device 100 moves forward, such that volume in the tubing 510 (which includes the buffer loop 514), the trap column 6, the metering device 106 and the connections is compressed. It can be compressed until analytical pressure is reached. By this step, the sample in the trap column 6 may be brought to an elevated pressure, such as to the analytical pressure. That is, the metering device 100 may compress or pressurize the trap column 6. By means of the pressure sensor 20, one may monitor the pressure in the section fluidly connected to the pressure sensor 20. In the configuration depicted in FIG. 6, this section also comprises the trap column 6. Thus, one may bring the pressure in this section to the analytical pressure. The sensor 20 may also be used for monitoring the decompression of a section of the system. That is, by means of the pressure sensor 20, one may monitor the pressure in this section and adapt the pressure change in this section accordingly.

The trap column 6 may now be fluidly connected to the analytical pump 12 on one side and to the separation column 4 on the other side. This may be done in different ways, depicted in FIGS. 7a and 7b, respectively.

FIG. 7a depicts a configuration, which may be referred to as the "inject backflush" configuration. The left valve 200 is switched such that the trap column 6 is introduced into the analytical flow in such a way that the analytical flow pushes the sample back out the side it came from (backward flush). That is, the flow direction through the trap column 6 is opposite to the flow direction with which the trap column 6 was supplied with the sample. Put differently, a first end of the trap column 6 that has been upstream to a second end of the trap column 6 when being provided with the sample is now downstream to this second end when the analytical flow is provided through the trap column 6.

Alternatively, as depicted in FIG. 7b, the analytical flow can push the sample further in the direction of the trap flow (forward flush). That is, the flow direction through the trap column 6 is parallel to the flow direction with which the trap column 6 was supplied with the sample. Put differently, a first end of the trap column 6 that has been upstream to a second end of the trap column 6 when being provided with the sample is now also upstream to this second end when the analytical flow is provided through the trap column 6.

Figure 8:
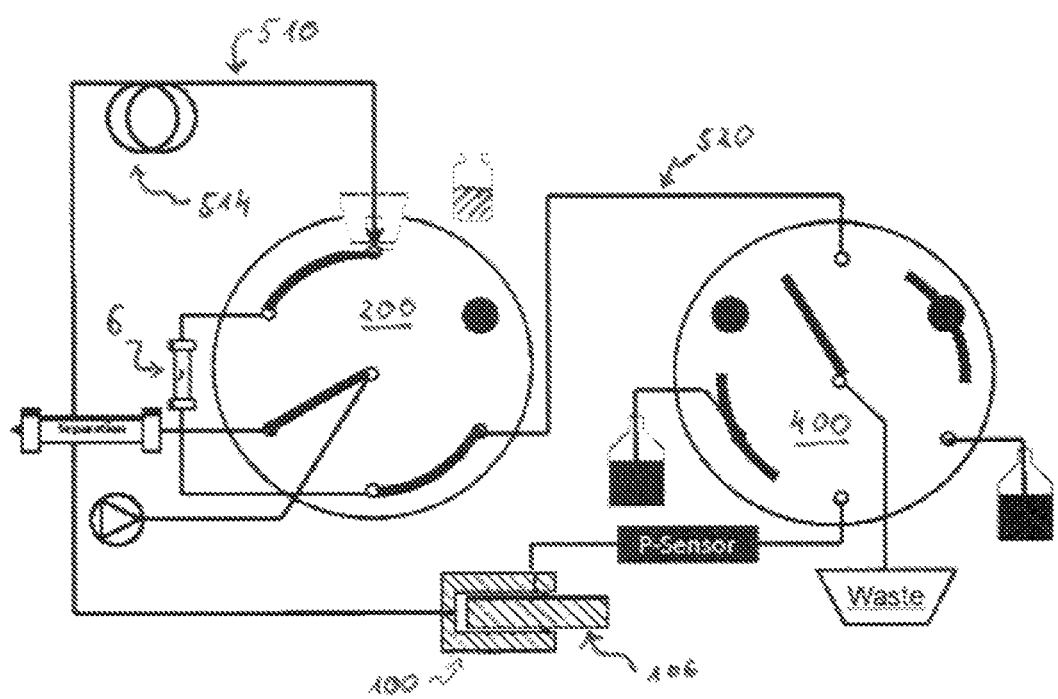
FIG. 8 depicts the system of FIG. 1 in an eighth configuration (which may be referred to as the "de-pressurize state")

FIG. 8 depicts a configuration similar to the configuration depicted in FIG. 6. Again, the trap column 6 is fluidly connected to the tubing 520 connecting valves 200 and 400 and to the tubing 510 (including the buffer loop 514) providing a connection to the metering device 100. By moving the piston 106 back, the pressure still present in the portion of the system 1000 fluidly connected to the trap column 6 (including the buffer loop 514, the metering device 100 and the connections) can be reduced. That is, this configuration may also be referred to as the decompress state. Again, it may be the metering device 100 providing for this decompression. The decompression may be monitored by means of the pressure sensor 20. The controlled decompression may be advantageous for different reasons. By means of the controlled decompression, no uncontrolled and more rapid decompression occurs. Thus, the controlled decompression leads to less abrasion on the valve 200 and other components and also prevents fluid from rapidly exiting the system (which could be a risk for a user). Furthermore, the controlled decompression also lowers the risk of components outgassing in the fluid in the system.

Figure 9:
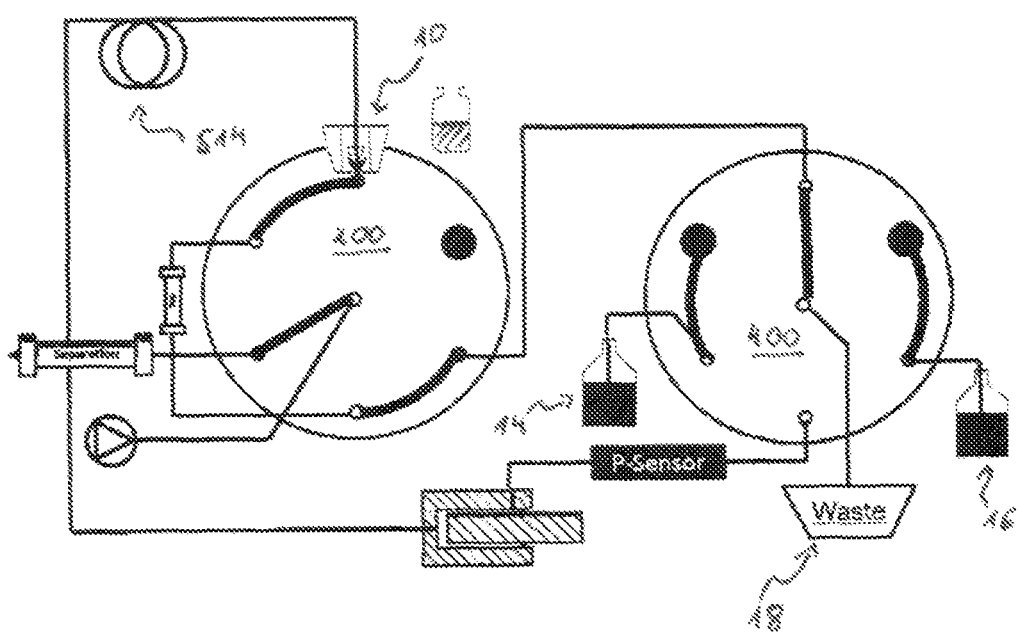
FIG. 9 depicts the system of FIG. 1 in a ninth configuration (which may be referred to as the "washing state").

FIG. 9 depicts a configuration where the trap column 6 is fluidly connected to the waste 18. In this state, if any residual pressure remains in the trap column 6 and the components fluidly connected thereto, it can be dissipated. That is, in comparison to FIG. 8, the right valve 400 can be switched to waste 18. This state may also be referred to as the equilibrium phase. The right valve 200 can reconnect the metering device 100 with solvent reservoir 14 or 16 from this position, draw up the respective solvent, and thus wash the trap column 6 and components fluidly connected thereto (including the buffer loop 514, the needle seat 10 and the trap column 6). That is, the metering device 100 may also be used to wash the system 1000. The washing is typically done iteratively with the configurations depicted in FIGS. 3 and 9. That is, the left valve 200 remains in one position and the right valve is iteratively switched. In the state depicted in FIG. 3, solvent may be drawn into the metering device and in the state depicted in FIG. 9, the components fluidly connected to the metering device 100 (also including the trap column 6) may be washed. Furthermore, it will be understood that washing and equilibrating may be performed simultaneously. Equilibrating may be done by means of the first (left) valve 200 by having the analytical pump 12 fluidly connected with the separation column 4 (i.e., valve 200 may not be switched when equilibrating) and the second (right) valve 400 being iteratively switched, as discussed.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A method performed in a liquid chromatography system, the method comprising a metering device providing a loading flow of solvent to transfer a sample into a trap column, wherein the method further comprises the metering device sucking in solvent and sample from different reservoirs, wherein the sample flow precedes the solvent flow.

2. The method according to claim 1, wherein the liquid chromatography system comprises a separation column, and wherein the method further comprises:

pressurizing the trap column to a first pressure while the trap column is isolated from an ambient atmosphere;

fluidly connecting the separation column to the trap column; and pushing the sample from the trap column to the separation column, wherein the step of pressurizing the trap column to the first pressure is performed before the trap column is fluidly connected to the separation column.

3. The method according to claim 2, wherein the metering device pressurizes the trap column to the first pressure.

4. The method according to claim 2, wherein the liquid chromatography system comprises:

A) an analytical pump;
B) a waste reservoir;
C) a needle;
D) a seat;
E) a first distributor valve comprising:
  a) a plurality of ports; and
  b) a plurality of connecting elements configured to changeably connect to the plurality of ports of the first distributor valve, wherein the plurality of ports of the first distributor valve comprises:
    i) a first port directly fluidly connected to the seat;
    ii) a second port and a third port that are both directly fluidly connected to the trap column;
    iii) a fourth port directly fluidly connected to the separation column;
    iv) a fifth port directly fluidly connected to the analytical pump; and
    v) a sixth port directly fluidly connected to a second distributor valve;

F) the second distributor valve comprising:
  a) a plurality of ports and
  b) a plurality of connecting elements configured to changeably connect the ports of the second distributor valve, wherein the plurality of ports of the second distribution valve comprises:
    i) a seventh port directly fluidly connected to the first distributor valve;
    ii) an eighth port directly fluidly connected to the waste reservoir;
    iii) a ninth port directly fluidly connected to the first solvent reservoir; and
    iv) a tenth port directly fluidly connected to the metering device; and wherein the method further comprises:

fluidly connecting the trap column to the analytical pump;

pushing the sample from the trap column to the separation column with the analytical pump; and fluidly connecting the trap column to the waste reservoir and flowing a fluid from the trap column to the waste reservoir.

5. The method according to claim 4 wherein the waste reservoir is at ambient pressure.

* * * * *

UNITED STATES PATENT AND TRADEMARK OFFICE
CERTIFICATE OF CORRECTION

PATENT NO. : 11,624,735 B2
APPLICATION NO. : 17/199812
DATED : April 11, 2023
INVENTOR(S) : Christoph Hollnagel et al.

It is certified that error appears in the above-identified patent and that said Letters Patent is hereby corrected as shown below:

In the Claims

In Column 20, Claim 5, Line 25, delete "claim 4" and insert -- claim 4, --, therefor.

Signed and Sealed this
First Day of October, 2024

Katherine Kelly Vidal
Director of the United States Patent and Trademark Office